(12) United States Patent
Felix et al.

(10) Patent No.: US 8,509,367 B2
(45) Date of Patent: Aug. 13, 2013

(54) RECEIVER INTERFACE

(75) Inventors: Stephen Felix, Bristol (GB); Colman Hegarty, Bristol (GB)

(73) Assignee: Icera, Inc., Wilmington, DE (US)

( * ) Notice: Subject to any disclaimer, the term of this patent is extended or adjusted under 35 U.S.C. 154(b) by 956 days.

(21) Appl. No.: 12/330,905

(22) Filed: Dec. 9, 2008

(65) Prior Publication Data

US 2009/0147888 A1 Jun. 11, 2009

(30) Foreign Application Priority Data

Dec. 11, 2007 (GB) .................................. 0724178.9

(51) Int. Cl.
*H04L 7/00* (2006.01)
(52) U.S. Cl.
USPC .............. 375/355; 326/93; 327/141; 375/359
(58) Field of Classification Search
None
See application file for complete search history.

(56) References Cited

U.S. PATENT DOCUMENTS 6,690,719 B1 * 2/2004 Raphaeli et al. ............... 375/222
7,826,566 B2 * 11/2010 Walker et al. .................. 375/340

* cited by examiner

*Primary Examiner* — Adolf Dsouza (57) ABSTRACT

The invention provides a receiver comprising a data input and a strobe input. The strobe signal transitions whenever two consecutive bits in the data signal are the same. The receiver comprises combining means for generating a recovered clock signal from a combination of the data and strobe signals. The receiver also comprises a first sampling stage arranged to sample the data signal in dependence on the recovered clock signal, the first sampling stage comprising a plurality of sampling circuits and being arranged to obtain consecutive samples of the data signal using alternating ones of the sampling circuits. A second sampling stage is arranged to sample the data from the first sampling stage in dependence on a local system clock signal.

33 Claims, 8 Drawing Sheets

RECEIVER INTERFACE

PRIORITY CLAIM

The present application claims the priority of Great Britain Patent Application No. 0724178.9 filed Dec. 11, 2007.

FIELD OF THE INVENTION

The present invention relates to a circuit and corresponding method for compensating for a timing skew between a data signal and an associated strobe signal.

BACKGROUND

Figure 2A:
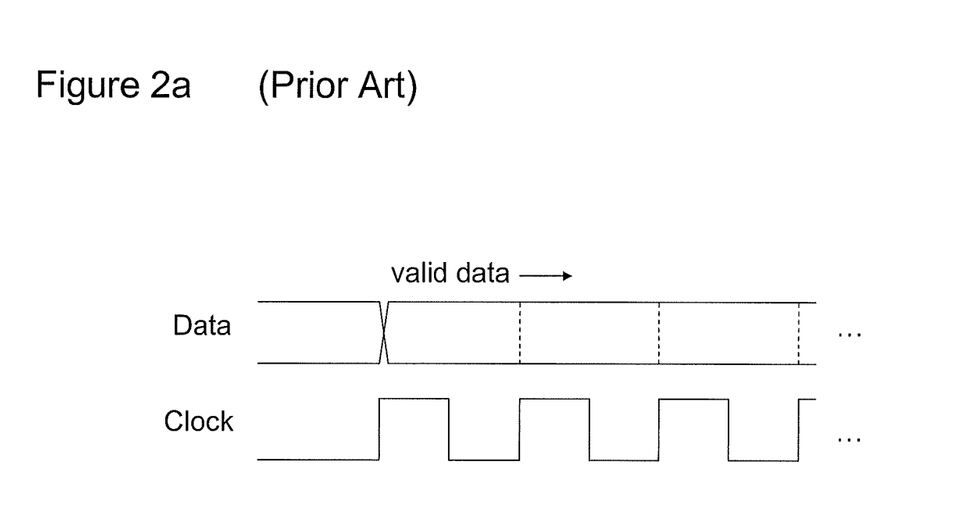
FIG. 2a is a timing diagram of a data signal and a clock signal.

FIG. 2a shows the signals on a conventional source synchronous serial link, where the data signal is accompanied by a clock signal sent from transmitter to receiver such that a rising edge on the clock signal occurs at the same time as each transition on the data signal. The receiver then samples data on the falling edge of clock.

As will be familiar to a person skilled in the art, data may alternatively be transmitted using a data line and an associated strobe line. A data signal carrying the actual data to be communicated is transmitted on the data line, and an associated strobe signal is transmitted on the strobe line to aid in validating the sampling of that data at the receiver.

Figure 2B:
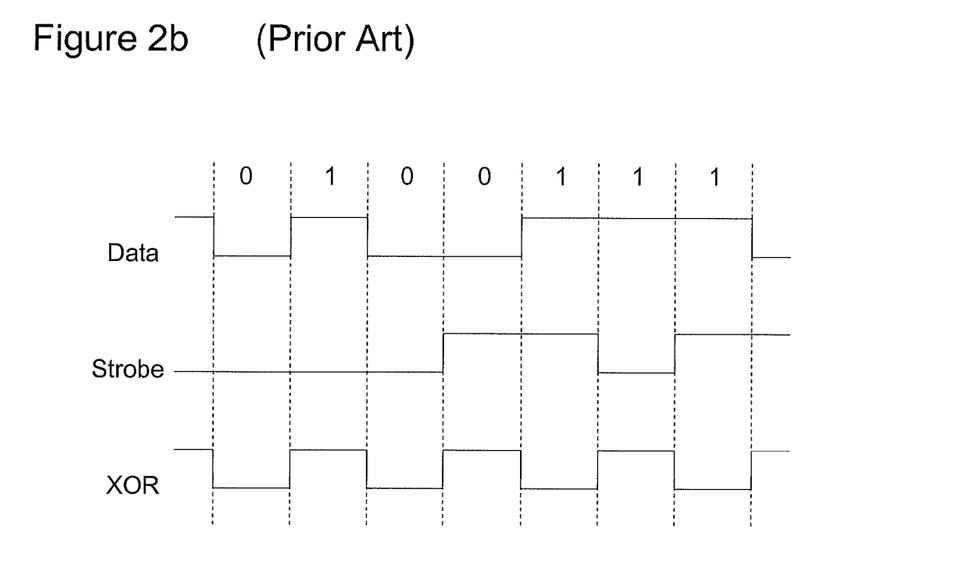
FIG. 2b is a timing diagram of a data signal and alternative strobe signal.

The strobe signal shown in FIG. 2b is an alternative to the clock signal of FIG. 2a. The strobe signal is used to transmit information allowing the transmitter's clock signal to be recovered at the receiver.

The data signal carries the raw data, and the strobe signal changes state whenever the data signal does not. That is, as illustrated in FIG. 2b, when two consecutive data bits of the same value are transmitted in the data signal, a logical transition is signalled in the strobe signal to delineate between those two bits. So for the first of two data bits of the same value the strobe is at a first logical level, and at the beginning of the second of those two bits the strobe signal transitions to the opposite logical level. The strobe signal then remains at that opposite logical level until the next time a data bit is transmitted having the same value as the previous bit (which could happen at the next bit if three bits of the same value are transmitted, or at a subsequent pair of bits).

In the example of FIG. 2b, a sequence of bits 0100111 is shown as being transmitted in the data signal. Throughout the first three data bits 010, the data changes at every bit and so the strobe remains at a constant logical level (in this case logic-zero). However, the fourth data bit is a 0, the same as the third. Therefore the strobe signal changes to the opposite logical level (in this case logic-one) for the duration of the fourth data bit. The fifth data bit is a 1, different to the fourth, so the strobe signal remains a constant logical level from the fourth to the fifth bit. But the sixth and seventh data bits are then both also 1, the same as the fifth, so the strobe changes back to the first logical level (logic zero) for the duration of the sixth data bit and then back again to the opposite logical level (logic one) for the duration of the seventh data bit.

Because one of the data or the strobe signal, but not both, always changes logical level at the boundary between every data bit, then the XOR of the data and strobe signal will recover the transmitted clock signal as shown. Thus a clock signal can be recovered at the receiver by taking the XOR of the data and strobe signals. This technique is sometimes known is "non-return to zero data-strobe encoding".

The difference over the clock signal of FIG. 2a is that either a rising or falling clock edge of the recovered clock may occur for each data bit. This has the advantages of greater tolerance of timing skew between the data and strobe signals than between the data and clock signals and lower average energy per bit (since the strobe signal need only change state when data signal does not).

Examples of this data/strobe technique are found in the physical layer interface for packet data connections in many applications, particularly in serial links, for example between a baseband modem device and an application processor device in the MIPI HSI standard. That is, the Mobile Industry Processor Interface (MIPI) Alliance standard for High-Speed Synchronous Serial Interface (HSI) physical layer version 1.0, available from the MIPI website www.mipi.org. Other applications are standardised in IEEE 1394 (FireWire) and IEEE 1355.

However, the situation described in relation in FIG. 2b is somewhat idealised. As the data rate is increased, the impact of timing uncertainties in the link on the bit time available for sampling at the receiver becomes more severe. Timing uncertainties include clock jitter in the transmitter and other factors, but the dominant contribution to timing uncertainty is the timing skew introduced between the data and strobe signals due to mismatch in the electrical delays on the data and strobe paths between the transmitter device and the receiver device. This includes mismatches within the transmitter and receiver devices themselves and also in the connection between the two, e.g. a wired connection such as on a circuit board on which the transmitter and receiver are both mounted.

Figure 2C:
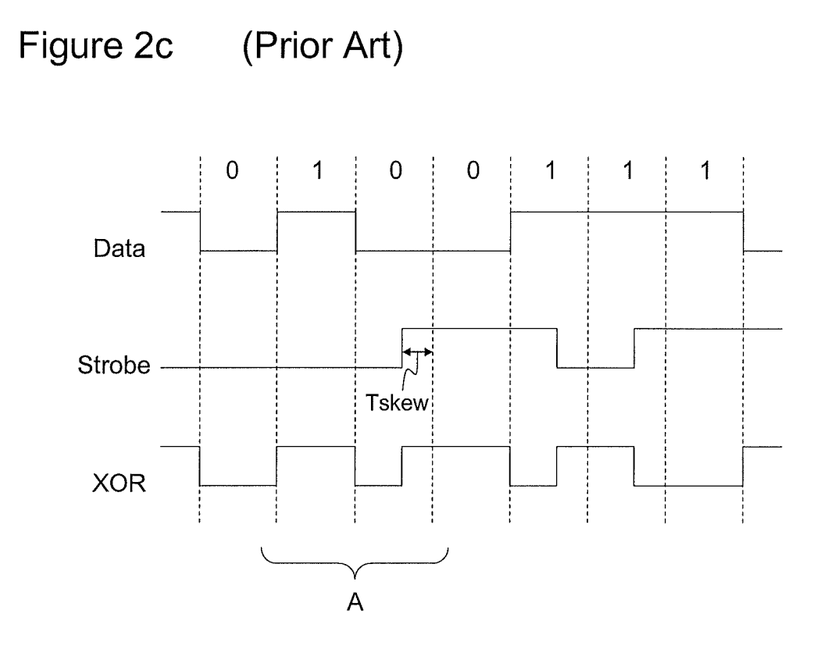
FIG. 2c is a timing diagram showing a skew between data and strobe signals.
Figure 2D:
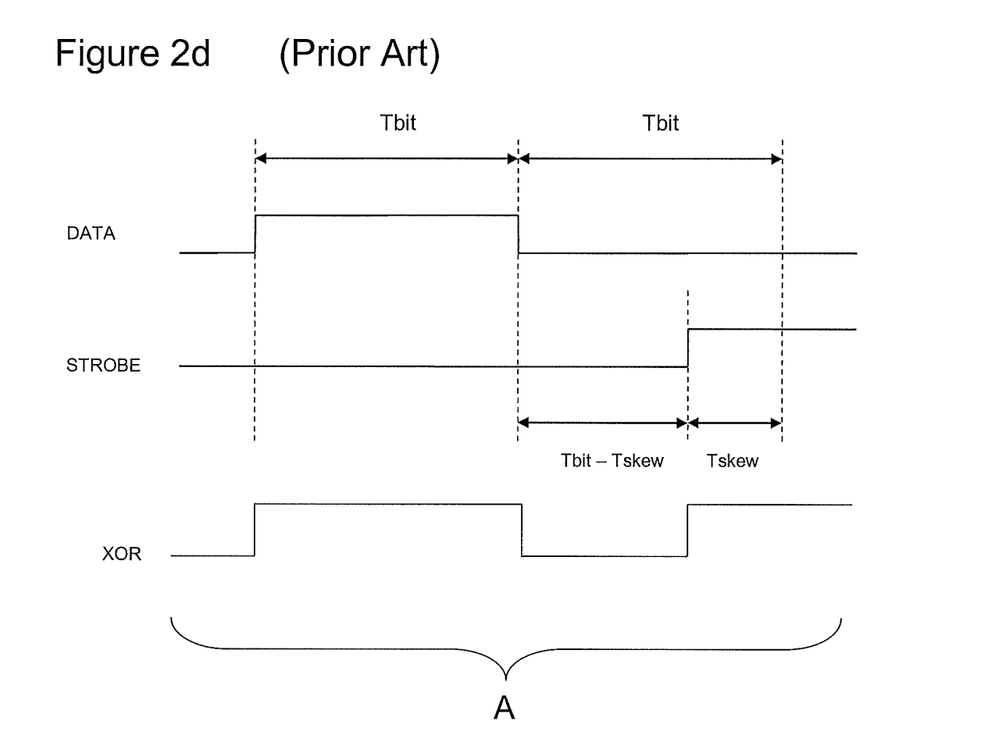
FIG. 2d is a further timing diagram showing a portion of FIG. 2c.

A more realistic situation is shown in FIG. 2c, where a timing skew has developed between the received data signal and the received strobe signal. In this example, the data signal lags the strobe signal by a time Tskew. FIG. 2d shows an enlarged portion A from the timing diagram of FIG. 2c.

Typically the data/strobe receiver is part of a larger integrated circuit, so the data packet or frame which is extracted by the receiver needs to be transferred to a system clock which is asynchronous to the timing of the serial link. For mobile applications especially the transmitter data rate may vary between the maximum rate and zero as a function of the functional or power saving mode of the transmitter and the system clock frequency in the receiver may vary as a function of the power saving mode of the receiver. Therefore it is desirable for the receiver to operate over a range of data rates and system clock frequencies without requiring an exact relationship between the two. Furthermore it is desirable to be able to receive variable-length frames as required in the MIPI HSI standard referenced above. Most importantly, it is desirable to minimise the effect of timing skew, which reduces the bit time at the receiver thereby limiting the rate at which data can be transmitted and still successfully sampled at the receiver.

Figure 1:
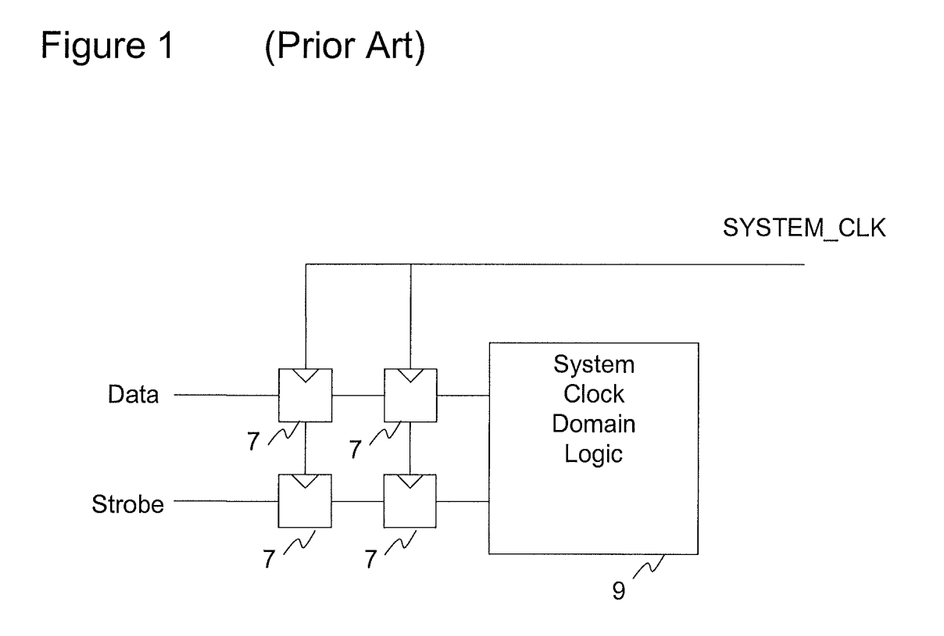
FIG. 1 is a schematic circuit diagram of an "over-sampling" receiver.

One type of receiver design which is known in the prior art is called here an "over-sampling receiver" and shown in FIG. 1. This receiver comprises a pair of flip-flops 7 disposed at each of the data and strobe inputs, each pair arranged as a short two-bit long shift register with inputs connected to receive the data and strobe signals respectively. The clock input of each flip flop 7 of each shift register is connected to the system clock (SYSTEM_CLK), and the output of each shift register is connected to the receiving logic 9 in the system clock domain. The function of the shift registers 7 is to resolve meta-stability in crossing between clock domains.

The over-sampling receiver operates by directly sampling the data and strobe signals using the system clock, i.e. by clocking the data and strobe signals through the flip-flops 7 of the respective shift registers into the receiving logic 9 in dependence on the system clock signal SYSTEM_CLK. The de-serialisation and de-framing of the data is implemented entirely in the system clock domain. While this is the simplest design, it has the disadvantage that the system clock must run fast enough to directly sample the data/strobe signals in the presence of timing uncertainty. It can be seen from FIG. 2*d* that the maximum sampling period for each of the data and strobe signals in this case is Tbit−Tskew and therefore the timing skew directly increases the minimum sampling system clock frequency. For example if the maximum timing skew is half the nominal bit time as is specified in the MIPI HSI standard, the system clock frequency must be more than twice the data rate. The requirement for increased minimum system clock frequency will typically affect the power consumption for entire receiving device not just the receiver circuit itself. So for a data rate of 100 Mbps as is typical in the MIPI HSI standard, a system clock speed of greater than 200 MHz is required even when the receiver is in a low-power mode.

Figure 3:
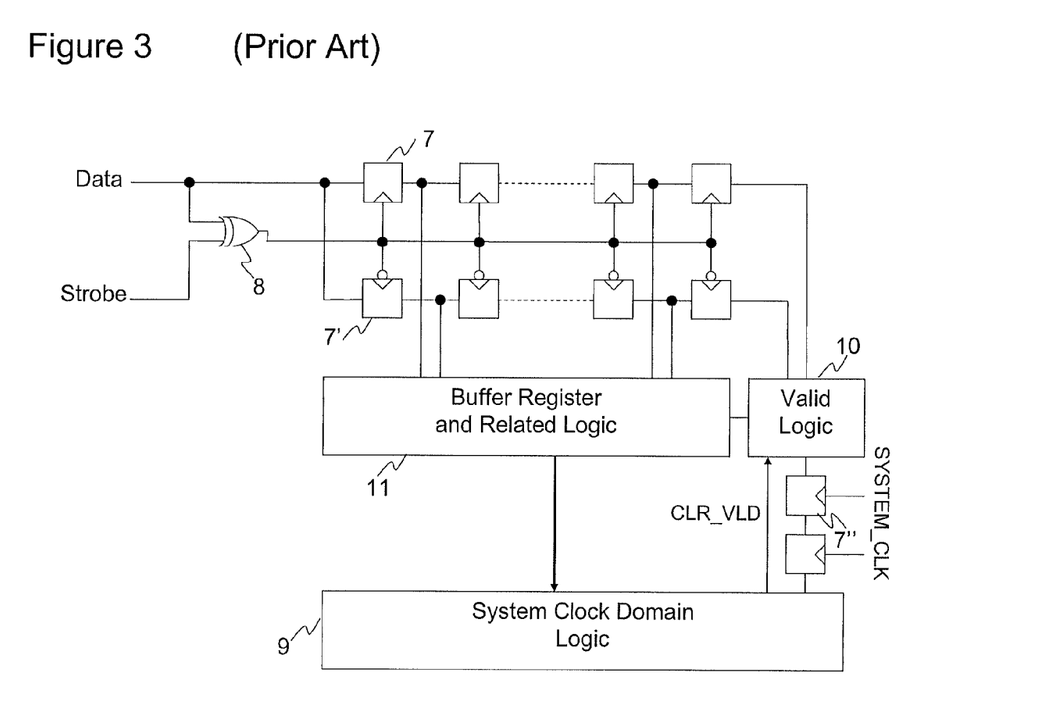
FIG. 3 is a schematic circuit diagram of an asynchronous receiver.

Another type of receiver known in the prior art is called here an "asynchronous receiver" shown in FIG. 3. This receiver comprises a series of first D-type flip-flops 7 and a series of second D-type flip-flops 7' disposed at the data input, each series arranged as a shift register with its input connected to receive the data signal. The receiver also comprises an XOR gate 8 with one input connected to the data input, the other input connected to the strobe input, and its output connected to the clock inputs of each of the flip-flops 7 and 7' of the shift registers. The first flip-flops 7 are a positive (rising) edge triggered flip-flops and the second flip-flops 7' are negative (falling) edge triggered flip-flops. The receiver further comprises buffer register 11 and related logic connected to receive the output of all but the last flip-flop 7 and 7' in each shift register series, and to provide an output to the receiving system clock domain logic 9. The receiver further comprises valid logic 10 connected to the final flip-flops 7 and 7' of each register and the buffer register and related logic 11, and two additional first flip-flops 7'' clocked by the system clock signal SYSTEM_CLK connected between and the receiving logic 9 and valid logic 10 with related logic.

In operation, the XOR gate 8 recovers the transmit clock as the XOR of the data and strobe signals, and provides the recovered clock signal to the clock inputs of each of the flip-flops 7 and 7' of each shift register. The recovered clock is thus used to clock a "double edge triggered" (DET) circuit, i.e. whereby the two shift registers consisting of the flip-flops 7 and 7' are triggered on the positive and negative edges of the recovered clock respectively. Data is shifted from left to right as each transition occurs on the recovered clock. A flag bit is initially set in the leftmost flip-flop of each chain. When this flag reaches the rightmost bit of either chain, it indicates to the valid logic 10 that a complete data frame has been received and causes the contents of the two shift registers to be copied to a buffer register 11 after which the data is synchronised to the system clock domain 9 using the additional flip-flops 7'''. Alternatively a bit counter may be employed to detect the end of frame. Note, the output of the XOR gate 8 is slightly delayed relative to the data input, so that the first flip-flop in each shift register does not attempt to sample on a data edge.

Looking at FIGS. 2*c* and 2*d*, it can be seen that the DET circuit thus has a "received bit time" of either Tbit+Tskew, Tbit, or Tbit−Tskew depending on the data at the time. The performance of the receiver is limited by the lowest bit time it can handle.

While this asynchronous receiver does not have the oversampling requirement of the design in FIG. 1, it has the disadvantage that most of the receiver circuit must operate at the DET rate which is set by the lower of the received bit times Tbit−Tskew. The relative complexity of the DET circuit results in large logic path delays between flip-flops which limits the bit time that the receiver can handle, resulting in lower data rate and poorer skew tolerance.

Further, this asynchronous receiver requires a shift register long enough to hold an entire frame, a buffer register 11 of the same size and handshake logic to control the loading of the buffer register 11 and the transfer to the system clock domain 9. This logic is complicated by the fact that when the frame length N is odd there will be for example (N−1)/2 bits in the positive edge triggered flip-flops and [(N−1)/2]+1 bits in the negative edge triggered flip-flops 7' at the end of one frame and the reverse on the next frame.

Variations of the asynchronous receiver are also known in the prior art which reduce the length of the positive and negative edge triggered shift registers and the holding register. This can be done by transferring M data bits at a time to the holding register where M<N (where N is the frame length). However this approach has significant disadvantage that it is not possible for the receiver to handle arbitrary frame size because M must divide N—otherwise the final (N modulo M) bits of the frame may remain undetected in the shift register indefinitely at the end of a received frame until the next frame arrives. This can affect system performance if the frame is for example a timing-critical control packet or a data packet requiring low latency transfer.

Other variations of the asynchronous receiver design in the prior art dispense with the need to detect the completion of a frame (or part of a frame) in the shift registers by relying on a fixed frequency relationship between the recovered clock and the (asynchronous) system clock. However these approaches do not allow the link to operate over the full range of possible data rates and system clock frequencies depending on the functional or power saving states of the transmitter and receiver.

SUMMARY

The present invention originates from the following observation. That is, while timing skew due to delay mismatch between the data and strobe signals can result in two consecutive data bits being received within a very short time Tbit−Tskew at the receiver, depending on the amount of skew, it may be observed that the reception of three data bits always requires two transitions on the same signal (either data or strobe). Therefore, as can be seen for example from FIGS. 2*c* and 2*d*, the smallest time in which three data bits will ever be received is 2Tbit−Tskew where Tbit is the nominal bit time and Tskew is the maximum timing skew between data and strobe signals.

According to one aspect of the present invention, there is provided a receiver comprising: a data input for receiving a data signal; a strobe input for receiving a strobe signal, the strobe signal transitioning whenever two consecutive bits in the data signal are the same; combining means for generating a recovered clock signal from a combination of the data signal and the strobe signal; a first sampling stage arranged to sample the data signal in dependence on the recovered clock signal, wherein the first sampling stage comprises a plurality of sampling circuits each arranged to receive the data signal, the first sampling stage being arranged to obtain consecutive samples of the data signal using alternating ones of the plurality of sampling circuits; and a second sampling stage arranged to sample the data from the first sampling stage in dependence on a local system clock signal.

Thus the improved receiver circuit make use of a very efficient first stage which separates consecutive received data bits and sends them to different sampling circuits. This means that successive data bits sent to any given sampling circuit are separated by at least one other bit in the data stream and therefore the time between bits seen at the each sampling circuit is at least 2Tbit−Tskew as explained above. Therefore even when the skew approaches the nominal bit time, the receiver can still operate correctly as long as the sampling system clock frequency is at least greater than the data rate. Alternatively if the timing skew is small then the system clock frequency can approach half the data rate. This is a significant improvement on the over-sampling receiver prior art. The skew between data and strobe signals cannot exceed the nominal bit time for a practical link in any case since the order of consecutive bits in time would then be reversed. Thus the present invention allows a timing skew between the data and strobe signals approaching the nominal bit time to be tolerated without requiring the system clock frequency to be higher than the data rate as in the over-sampling receiver prior art.

At the same time, only a relatively small amount of logic may be needed to operate at the rate of the first stage, e.g. the double edge triggered (DET) rate, and most of the receiver logic operates in the system clock domain as for the over-sampling receiver. This means that the maximum path delay in the first stage logic is shorter than in the asynchronous receiver prior art, again allowing either increased skew tolerance or increased data rate over the prior art.

Furthermore, in embodiments no fixed frame size or fixed relationship between the transmit data rate and the receiver system clock frequency need be assumed, other than the requirement that the system clock frequency must be above a certain minimum value as explained above. This is due to the fact that each received bit can be uniquely detected in the system clock domain.

In further embodiments, the first sampling stage may comprise a double edge triggered (DET) stage arranged to sample the received data signal on both a rising and a falling edge of the recovered clock signal.

The combining means may comprise an XOR gate arranged to recover the clock signal by taking the XOR of the data signal and the strobe signal.

Said plurality of sampling circuits may be at least three sampling circuits. Said plurality of sampling circuits may be an odd number of sampling circuits.

The first sampling stage may be arranged to sample said consecutive samples of the data signal using said alternating ones of the plurality of sampling circuits in a round robin manner.

The first sampling stage may be arranged to sample the received strobe signal in dependence on the recovered clock signal, and may be arranged to obtain consecutive samples of the received strobe signal using said alternating ones of the plurality of sampling circuits.

The first sampling stage may be arranged to generate a generated strobe signal from the data samples sampled by the first sampling stage. Each of said plurality of sampling circuits may comprise a data/strobe encoder arranged to generate said generated strobe signal for the respective data samples obtained by that sampling circuit.

The second data stage may be configured to generate a valid signal in dependence on said sampled data and said sampled or generated strobe signal to indicate when the data output by the second sampling stage is valid.

The receiver may be arranged to receive the data and strobe signals according to a serial protocol. The receiver may be arranged to receive the data and strobe signals according to an MIPI HSI standard. The receiver may be arranged to receive the data and strobe signals according to one of standards IEEE 1394 and IEEE 1355.

The receiver may comprise front-end circuit in front of the data and strobe inputs configured to convert another serial protocol to data-and-strobe form. Said other protocol may be SPI (Serial Peripheral Interface) protocol.

The data input and strobe inputs may comprise a wired connection to a transmitter of the data and strobe signals.

According to another aspect of the present invention, there is provided a method of receiving and sampling data comprising: receiving a data signal; receiving a strobe signal which transitions whenever two consecutive bits in the data signal are the same; generating a recovered clock signal from a combination of the data signal and the strobe signal; sampling the data signal at a first sampling stage in dependence on the recovered clock signal, by supplying the data signal to a plurality of sampling circuits and obtaining consecutive samples of the data signal using alternating ones of the plurality of sampling circuits; and sampling the data from the first sampling stage at a second sampling stage in dependence on a local system clock signal.

According to another aspect of the present invention, there is provided a system comprising a transmitter, a receiver, and a wired connection therebetween for transmitting a data signal and a strobe signal from the transmitter to the receiver, the strobe signal transitioning whenever two consecutive data bits in the data signal are the same, and the receiver comprising: combining means for generating a recovered clock signal from a combination of the data signal and the strobe signal; a first sampling stage arranged to sample the data signal in dependence on the recovered clock signal, wherein the first sampling stage comprises a plurality of sampling circuits each arranged to receive the data signal, the first sampling stage being arranged to obtain consecutive samples of the data signal using alternating ones of the plurality of sampling circuits; and a second sampling stage arranged to sample the data from the first sampling stage in dependence on a local system clock signal.

For a better understanding of the present invention and to show how it may be carried into effect, reference will now be made by way of example to the accompanying drawings.

DETAILED DESCRIPTION OF PREFERRED EMBODIMENTS

Figure 4A:
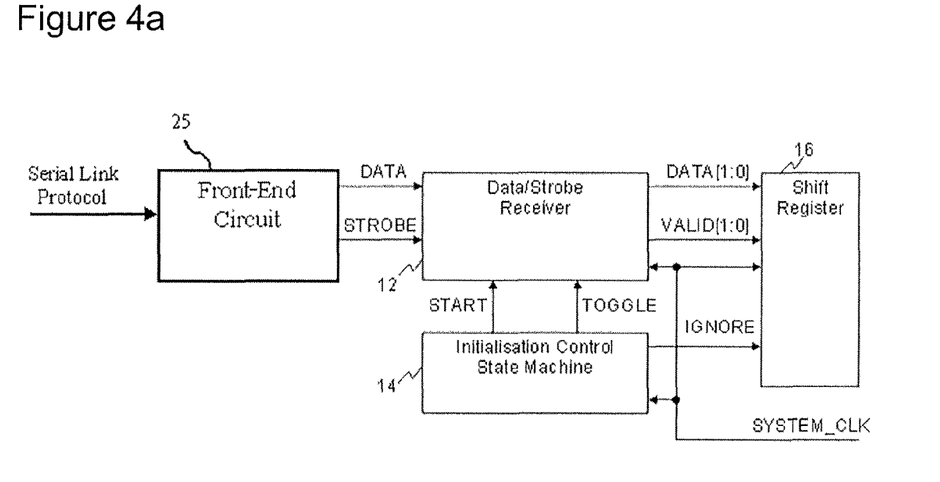
FIG. 4a is a schematic block diagram of an improved receiver.
Figure 4B:
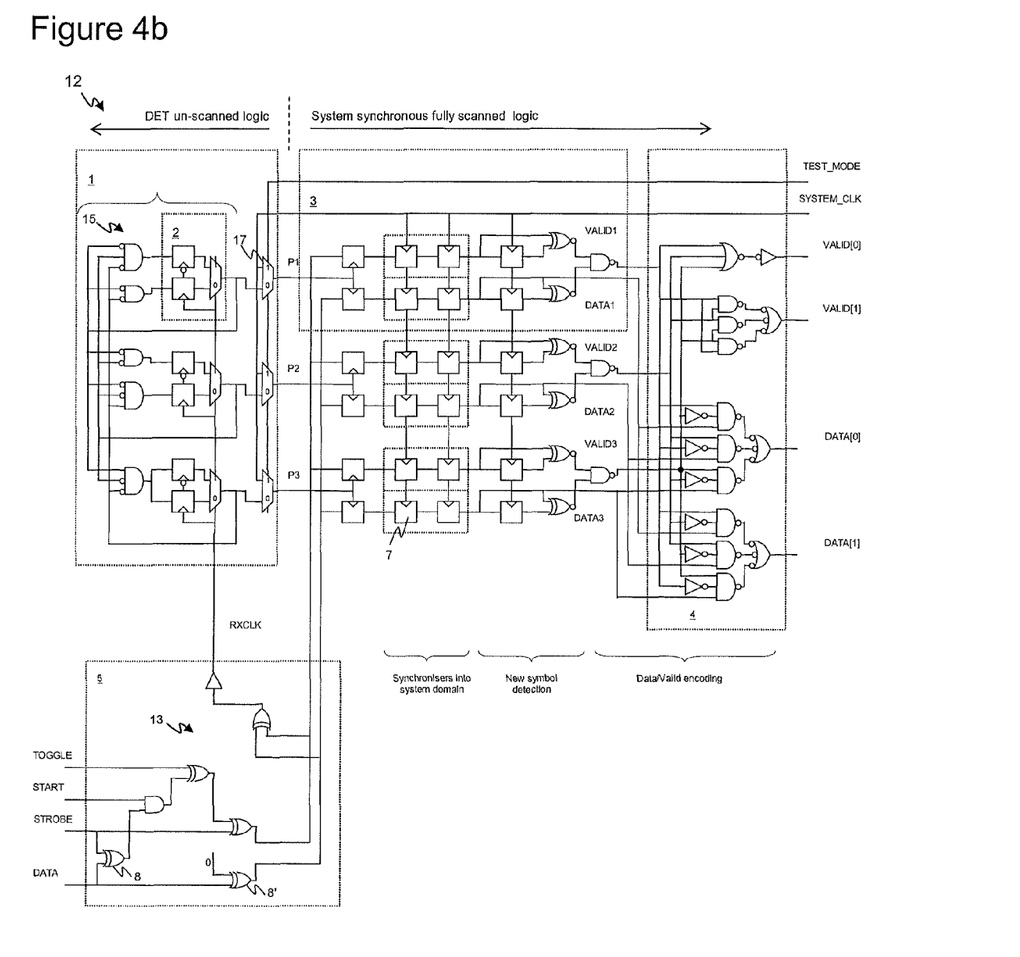
FIG. 4b is a schematic circuit diagram of a data/strobe receiver.

A first embodiment of the present invention is now described in relation to FIGS. 4a and 4b.

FIG. 4a is a high level schematic block diagram of a receiver, comprising a data/strobe receiver 12, an initialisation control state machine 14, and an output shift register 16. The initialisation control state machine 14 is arranged to supply a start signal (START) and a toggle signal (TOGGLE) to the data/strobe receiver 12, and to supply an ignore signal (IGNORE) to the output shift register 16. The data/strobe receiver 12 is arranged to receive the start and toggle signals from the initialisation control state machine 14, to receive an input data signal (DATA) and a strobe signal (STROBE) from a transmitter (not shown) at respective data and strobe inputs, and to supply sampled data signals (DATA[1:0]) and valid signals (VALID[1:0]) to the output shift register 16. The output shift register 16 is arranged to receive the sampled data signals and valid signals from the data/strobe receiver 12, and to receive the ignore signal from the initialisation control state machine. Each of the data/strobe receiver 12, initialisation control state machine 14 and output shift register is receive a system clock signal (SYSTEM_CLK) at respective clock inputs.

The data/strobe receiver 12 is shown in more detail in the circuit diagram of FIG. 4b. The data/strobe receiver 12 comprises a DET state machine 1, a plurality of sampling circuits 3, encoding logic 4, and an initialisation circuit 5. each comprising hardware logic connected as indicated in FIG. 4b.

The initialisation circuit 5 comprises initialisation gating logic 13 and an XOR 8. The XOR 8 gate has inputs connected receive the data signal (DATA) and strobe signal (STROBE) from the data and strobe inputs of the receiver respectively. The initialisation gating logic 13 has inputs connected to receive the start signal (START) and toggle signal (TOGGLE) from the initialisation control state machine 14, another input connected to the output of the XOR gate, and an output connected to supply a gated recovered clock signal (RXCLK) to each of the output circuits 2 of the DET state machine. The gating logic 13 is also arranged to pass the DATA and STROBE signals to each of the sampling circuits 3 (in dependence on the TOGGLE signal).

The DET state machine 1 comprises a plurality of output circuits 2, one for each of the sampling circuits 3, and associated DET logic 15. The DET state machine may also comprises a plurality of test-mode multiplexers 17, one for each of the sampling circuits 3, each having a control input arranged to receive an external test-mode signal (TEST_MODE) from the exterior of the chip. Each output circuit 2 comprises a pair of flip-flops: one positive edge triggered flip-flop and one negative edge triggered flip flop, each having its clock input connected to receive the recovered clock signal (RXCLK) from the initialisation circuit 5 and its sampling (D) input connected to the associated DET logic 15. In each output circuit 2, each of the two flip-flops has its output connected to a respective input of a two-input multiplexer, that multiplexer having a control input connected to receive the recovered clock signal (RXCLK) and its output connected to an input of a respective one of the test-mode multiplexer 17. Each test-mode multiplexer is also a two-input multiplexer, having its other input connected to receive the system clock signal SYSTEM_CLK. The output of each test-mode multiplexer 17 has its output connected to supply a respective pulse signal P1, P2 or P3 to a respective one of the sampling circuits 3.

Each sampling circuit 3 comprises two sampling paths each comprising a chain of flip-flops 7, with one path connected to receive the DATA signal from the initialisation circuit 5 and the other path connected to receive the STROBE signal from the initialisation circuit 5. Each sampling path in each sampling circuit 3 begins with a first flip-flop, each having its clock input connected to the pulse output P1, P2 or P3 of the corresponding test-mode multiplexer 17 and its sampling (D) input connected to receive the DATA or STROBE signal from the initialisation circuit 5 as appropriate to that path. The next stage in each sampling path is a pair of second flip-flops connected as a two-bit shift register, with its sampling input connected to the output of the first flip-flop and its clock input connected to receive the system clock signal (SYSTEM_CLK). Each sampling circuit 3 further comprises symbol detection logic having logic gates and further flip-flops clocked by the system clock signal (SYSTEM_CLK), arranged to receive the outputs of each of the two two-bit shift registers in the respective sampling path and to supply a respective sampled data signal DATA1 ... 3 and valid signal VALID1 ... 3 to the encoding logic 4. The encoding logic 4 is arranged to output a combined sampled data signal (DATA[1:0]) and valid signal (VALID[1:0]) to the output shift register 16.

In this embodiment the DATA and STROBE signals are directly sampled using the system clock. The significant difference versus the prior art is that a very simple DET circuit is used (i.e. a small amount of logic is required in the DET domain) to generate sampling pulses that control K parallel sampling circuits which are synchronous to the system clock, where K is any odd number greater than or equal to three. The embodiment shown uses K=3 and allows a timing skew between DATA and STROBE of up to the nominal bit time as long as the system clock frequency is greater than the data rate.

In operation, the DET state machine 1 in FIG. 4B generates the sampling pulses for the sampling circuits and is clocked by the recovered clock RXCLK which is the XOR of the DATA and STROBE signals. The state machine will advance to the next state on both positive and negative edges of the recovered clock generating a sampling clock edge on signals P1, P2 or P3 for one of the three parallel sampling circuits as it changes state. The sequence of sampling edges is P1, P2, P3 and the sequence then repeats from P1. Note that a present state of zero generates different next states on the positive and negative clock edges—this is necessary to correctly start up from the zero state. The state table for the sampling state machine is shown in the table below.

| Present State | | | Next State | | | |
|---|---|---|---|---|---|---|
| P3 | P2 | P1 | P3 | P2 | P1 | Note |
| — | — | — | 0 | 0 | 0 | Reset -> Zero |
| 0 | 0 | 1 | 1 | 0 | 0 | P1 -> P3 |
| 0 | 1 | 0 | 0 | 0 | 1 | P2 -> P1 |
| 1 | 0 | 0 | 0 | 1 | 0 | P3 -> P2 |
| 0 | 0 | 0 | 0 | 0 | 1 | Zero -> P1 (+ve edge) |
| 0 | 0 | 0 | 0 | 1 | 0 | Zero -> P2 (−ve edge) |
| Others | | | 0 | 0 | 0 | Illegal -> Zero |

The output circuits 2 of the state machine 1 are designed to avoid timing variations in the sampling pulses P1 ... 3 due to different propagation delays from the positive and negative edges of the clock to the sampling pulse outputs. This is important in this embodiment since the timing of the sampling pulses must be delayed relative to the arrival time of the data and strobe signal inputs at each sampler, such that the sampling pulse causes the flip-flops at the input of the sampler to capture the data/strobe signal values which generated the recovered clock edge that produced that sampling pulse.

Each of the three (or in general K) sampling circuits 3 contains of a pair of flip-flops that capture the DATA/STROBE signal inputs when triggered by the corresponding sampling signal P1 . . . 3. The outputs of these flip-flops are then synchronised to the system clock using two-stage synchronisers (the two-bit shift registers). Only one of DATA and STROBE will transition for each received bit, so there is no danger of the synchronisers sampling an incorrect transitional value—this is a result of the fact that the number of samplers K is odd. Following the synchronisers is logic to generate the VALID1-3 and DATA1-3 signals as shown.

The encoding logic 4 in FIG. 4B takes the VALID1 . . . 3 and DATA1 . . . 3 signals from the samplers and encodes them into DATA[1:0] and VALID[1:0] which are input to an output shift register 16 than can accept 0, 1 or 2 data bits in each system clock cycle. Because the sampling pulses P1 . . . P3 are generated in a fixed round-robin order, the data bits from each sampler can be assembled in the correct order in the output shift register 16 if two bits are received from two samplers 3 in one system clock cycle.

After reset, the data/strobe receiver 12 needs to be initialised before frame data can be correctly received. The initialisation is performed by the initialisation circuit 5 in FIG. 4B under the control of the START and TOGGLE control signals from the initialisation control state machine 14 operating in the system clock domain as shown in FIG. 4A. The control signals are designed to be glitch-free and only one transitions per system clock cycle. The following functions are performed by the initialisation gating logic 13: a) if the initial value of RXCLK is high (due to the initial values of DATA and STROBE not both being zero) it is forced low because the sampling state machine requires that the first transition is a rising edge; b) since all flip-flops in the sampling circuits 3 and synchronisers are reset to the zero state samples must be injected to initialise these flip-flops (otherwise an initial received bit with DATA=0, STROBE=0 would be undetected); and c) the first transition on RXCLK does not produce any sampling pulse so it must be generated by the initialisation logic to avoid losing the first received bit. In total eight (in general 2K+2) transitions on RXCLK are generated. The initialisation circuit 5 balances the logic delay on the DATA and STROBE signal paths to avoid introducing any additional skew—this is the reason for the logically redundant XOR gate 8'. The system clock can be input to the sampling circuits for scan test using the test-mode multiplexers 17.

The IGNORE signal is asserted by the initialisation state machine 14 to ensure that the bits generated by the initialisation process after reset are ignored by the shift register. The reset circuit is not shown in FIG. 4b.

Figure 5:
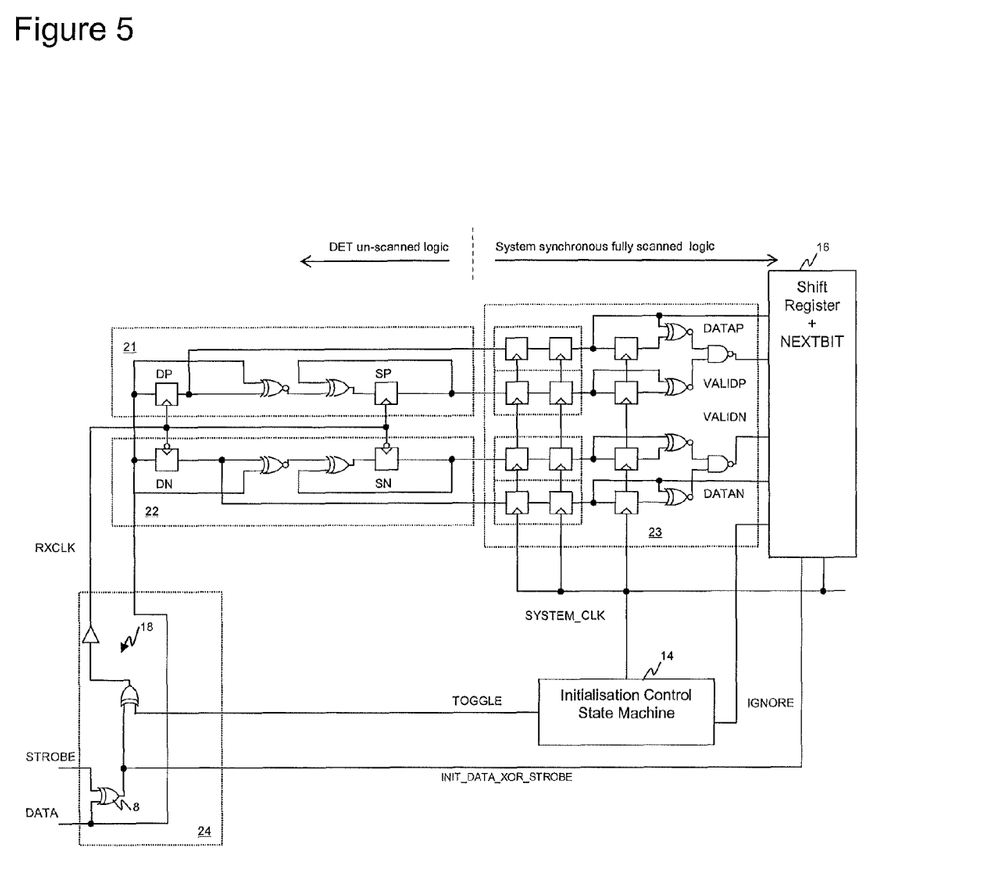
FIG. 5 is a schematic circuit diagram of another data/strobe receiver.

A second alternative embodiment is now described in relation to FIG. 5.

In this second embodiment, the receiver comprises an initialisation circuit 24, a pair of capture circuits 21 and 22, a system clock domain synchronisation portion 23, an initialisation control state machine 14, and an output shift register 16. The initialisation state machine 14 and shift register 16 in FIG. 5 are functionally slightly different from those in FIG. 4a.

The initialisation circuit 24 is arranged to receive the DATA and STROBE signals from the data and strobe inputs respectively, to receive a toggle signal (TOGGLE) from the initialisation control state machine 14, to supply a gated version of the recovered clock signal (RXCLK) to the capture circuits 21 and 22, and to supply an un-gated version of recovered clock signal (INIT_DATA_XOR_STROBE) to the output shift register 16. Each capture circuit 21 and 22 is arranged to receive the RXCLK and un-gated DATA signals from the initialisation circuit 24, and to output a respective sampled data signal and respective generated strobe signal to the synchronisation portion 23. The synchronisation portion 23 is arranged to receive the sampled data and generated strobe signals from the capture circuits 21 and 22, to pass sampled data signal DATAP and DATAN to the shift register 16, and to output valid signals VALIDP and VALID N to the shift register 16. The initialisation control state machine 14 is arranged to supply an ignore signal (IGNORE) to the shift register 16. The shift register 16 is arranged to receive the sampled data signals DATAP/N and valid signals VALIDP/N from the synchronisation portion 23, and to receive the IGNORE signal from the initialisation control state machine 14. Each of the synchronisation portion 23, initialisation control state machine 24, and output shift register 16 is also arranged to receive the system clock signal (SYSTEM_CLK).

The initialisation circuit 24 comprises an XOR gate 8 with its inputs connected to receive the DATA and STROBE signals from the data and strobe inputs of the receiver respectively. The output of the XOR gate is connected to the output shift register 16 to supply the signal INIT_DATA_XOR_STROBE. The initialisation circuit 24 also comprises additional gating logic 18 with one input connected to the output of the XOR gate 8 and another input connected to receive the TOGGLE signal from the initialisation control state machine 14. The output of the gating logic 18 is connected to supply the recovered clock signal RXCLK to the capture circuits 21 and 22 (in dependence on the TOGGLE signal).

The first capture circuit 21 is a positive-edge capture circuit comprising two flip-flops DP and SP plus first associated logic. The flip-flop DP is connected to sample the DATA signal from the data input on a positive (rising) edge of the recovered clock signal received from the initialisation circuit 24. The first associated logic has an input connected to the output of the flip-flop DP and is arranged to output a generated strobe signal in dependence thereon. The flip-flop SP is connected to sample the generated strobe signal from the first associated logic on a positive (rising) edge of the recovered clock signal received from the initialisation circuit 24. The outputs of the flip-flops DP and SP are connected to the synchronisation portion 23.

The second capture circuit 22 is a negative-edge capture circuit comprising two flip-flops DN and SN plus second associated logic. The flip-flop DN is connected to sample the DATA signal from the data input on a negative (falling) edge of the recovered clock signal received from the initialisation circuit 24. The second associated logic has an input connected to the output of the flip-flop DN and is arranged to output a generated strobe signal in dependence thereon. The flip-flop SN is connected to sample the generated strobe signal from the first associated logic on a negative (falling) edge of the recovered clock signal received from the initialisation circuit 24. The outputs of the flip-flops DN and SN are connected to the synchronisation portion 23.

The synchronisation portion 23 comprises two pairs of sampling paths, one pair for each of the capture circuits 21 and 22. Each path comprises a pair of flip-flops arranged as a two-bit shift register with its clock input connected to receive the system clock signal SYSTEM_CLK and its sampling input connected to the respective one of the outputs of flip-flops DP, SP, DN and SN of the capture circuits 21 and 22 as appropriate. The outputs of each pair of two-bit shift registers in the two paths are connected to additional synchronisation logic comprising logic gates and further flip-flops. This additional synchronisation logic is arranged to output the sampled data and valid signals DATAP and VALIDP to the output shift register 16 based on the outputs of flip-flops DP and SP of the positive edge triggered capture circuit 21, and which outputs the sampled data and valid signals DATAN and VALIDN to the output shift register 16 based on the outputs of flip-flops DN and SN of the negative edge triggered capture circuit 22.

In operation, in this embodiment the DATA and STROBE signals are fed into DET capture circuits 21 and 22 clocked by the recovered clock, whose output is sampled by the system clock rather than sampling DATA and STROBE directly. The recovered clock RXCLK is the XOR of DATA and STROBE as before. This receiver is shown in FIG. 5.

There are two capture circuits 21 and 22 containing D flip-flops which update on the positive and negative edges of the recovered clock respectively. The positive edge capture circuit consists of flip-flops DP and SP and the negative edge capture circuit of flip-flops DN and SN. However unlike the prior art these are data/strobe encoders not shift registers. For example if two successive data bits DP are the same SP will toggle. This allows each successive bit received by each capture circuit 21 and 22 to be detected at the receiver, so the transmit data rate can be arbitrarily low in relation to the system clock frequency without any danger of the same bit being sampled more than once and interpreted as more than one data bit in the system clock domain. There is also no possibility of the synchronisers in portion 23 capturing an invalid transitional value. At the same time there is no need to detect the end of a data frame in the DET domain since each bit is detected independently and therefore the frame size is completely variable.

The outputs of the two capture circuits are separately synchronised into the system clock domain in part 23 in FIG. 5. When a bit is received on one capture circuit, the next bit will go to the other capture circuit. This means that three bits must be received in order for two successive transitions to occur on either capture circuit and therefore the maximum sampling system clock period is 2Tbit–Tskew as for receiver the first embodiment.

The synchronised values of DP/SP and DN/SN in each system clock cycle are encoded into DATAP/N and VALIDP/N and input into a shift register which can accept 0, 1 or 2 bits per system clock cycle. When the output shift register block 16 leaves the reset state (reset circuit not shown), the value of INIT_DATA_XOR_STROBE is sampled (no synchroniser is needed since DATA and STROBE are static at this time). This sets the initial value of the NEXTBIT flag which indicates whether the next received bit will come from the P (NEXTBIT=0) or the N (NEXTBIT=1) capture circuit. The NEXTBIT flag is updated in each system clock cycle in the following way: if a single bit is received NEXTBIT is inverted, if zero or two bits are received then NEXTBIT retains the same value. This allows DATAP/N to be correctly ordered in the output shift register 16 if VALIDP and VALIDN are both asserted in the same cycle. The receiver is initialised by an initialisation circuit 24 under the control of the initialisation state machine 14 in a similar manner to receiver of the first embodiment. This initialisation is necessary to capture the initial value of the DATA signal into the capture circuits 21 and 22: the IGNORE signal is asserted during initialisation in a similar manner to the first embodiment. Multiplexers (not shown) can be inserted in front of the synchronisers (the two-bit shift registers in the synchronisation portion 23) to allow controllability for scan test. The described embodiments thus provide the following advantages over the prior art:

significantly improved tolerance of timing skew between data and strobe signals or alternatively higher data rate for a given system clock frequency;

at the same time, only a relatively small amount of logic may be needed to operate at the double edge triggered (DET) rate, with most of the receiver logic operating in the system clock domain, which means that the maximum path delay in the DET logic is reduced;

no restriction on frame size which is a requirement to support certain standards;

only a simple minimum constraint on receiver system clock frequency in relation to maximum skew and transmit data rate allowing the system clock frequency to be varied to implement power saving modes in the receiver device and the transmit data rate to be varied to implement power saving modes in the transmitter device. These power saving modes are particularly important for mobile applications; and most of the receiver logic is single edge triggered and synchronous to the system clock resulting in a robust design well suited to modern EDA software tools and compatible with conventional scan-based manufacturing test.

The receiver of the second embodiment is generally preferred over receiver of the first embodiment, because there are no half-cycle paths in the DET circuit (i.e. timing paths from a positive clock edge to a negative clock edge or vice-versa). This means that the circuit is even more tolerant of very short instantaneous bit times due to timing skew than the prior art resulting in greater skew tolerance or higher data rates.

However the receiver of the first embodiment may be preferred if a low ratio of system clock frequency to data rate is desired, since the number K of parallel sampling circuits can be increased to an odd number greater than 3 to support such a ratio, while the second embodiment requires a minimum ratio of 1:2 even when the skew is zero.

As mentioned, a front-end circuit may be added in front of the data/strobe inputs of the receiver (of either embodiment) to convert other common serial link protocols such as SPI (Serial Peripheral Interface) to data/strobe form allowing such protocols to be supported by the receiver. An example of such a front-end circuit is front-end circuit 25 of FIG. 4a.

It will be appreciated that the above embodiments are described only by way of example. Other variations and uses of the present invention may be apparent to a person skilled in the art given the disclosure herein. The scope of the invention is not limited by the described embodiments, but only by the following claims.

The invention claimed is:

1. A receiver comprising:
    a data input for receiving a data signal;
    a strobe input for receiving a strobe signal, the strobe signal transitioning whenever two consecutive bits in the data signal are the same;
    combining means for generating a recovered clock signal from a combination of the data signal and the strobe signal;
    a first sampling stage arranged to sample the data signal in dependence on the recovered clock signal, wherein the first sampling stage comprises a plurality of sampling circuits each arranged to receive the data signal, the first sampling stage being arranged to obtain consecutive samples of the data signal using alternating ones of the plurality of sampling circuits; and
    a second sampling stage arranged to sample the data from the first sampling stage in dependence on a local system clock signal, wherein the second sampling stage includes a pair of sampling paths for each of the plurality of sampling circuits of the first sampling stage.

2. The receiver according to claim 1, wherein the first sampling stage comprises a double edge triggered stage arranged to sample the received data signal on both a rising and a falling edge of the recovered clock signal.

3. The receiver according to claim 1, wherein the combining means comprises an XOR gate arranged to recover the clock signal by taking the XOR of the data signal and the strobe signal.

4. The receiver according to claim 1, wherein said plurality of sampling circuits is at least three sampling circuits.

5. The receiver according to claim 1, wherein said plurality of sampling circuits is an odd number of sampling circuits.

6. The receiver according to claim 1, wherein the first sampling stage is arranged to sample said consecutive samples of the data signal using said alternating ones of the plurality of sampling circuits in a round robin manner.

7. The receiver according to claim 1, wherein the first sampling stage is arranged to sample the received strobe signal in dependence on the recovered clock signal, and is arranged to obtain consecutive samples of the received strobe signal using said alternating ones of the plurality of sampling circuits.

8. The receiver according to claim 1, wherein the first sampling stage is arranged to generate a generated strobe signal from the data samples sampled by the first sampling stage.

9. The receiver according to claim 8, wherein each of said plurality of sampling circuits comprises a data/strobe encoder arranged to generate said generated strobe signal for the respective data samples obtained by that sampling circuit.

10. The receiver according to claim 7, wherein the second data stage is configured to generate a valid signal in dependence on said sampled data and said sampled or generated strobe signal to indicate when the data output by the second sampling stage is valid.

11. The receiver according to claim 1, wherein the receiver is arranged to receive the data and strobe signals according to a serial protocol.

12. The receiver according to claim 11, wherein the receiver is arranged to receive the data and strobe signals according to an MIPI HSI standard.

13. The receiver according to claim 11, wherein the receiver is arranged to receive the data and strobe signals according to one of standards IEEE 1394 and IEEE 1355.

14. The receiver according to claim 11, comprising front-end circuit in front of the data and strobe inputs configured to convert another serial protocol to data-and-strobe form.

15. The receiver according to claim 14, wherein said other protocol is SPI (Serial Peripheral Interface) protocol.

16. The receiver according to claim 1, wherein the data input and strobe inputs comprise a wired connection to a transmitter of the data and strobe signals.

17. A method of receiving and sampling data comprising:
receiving a data signal;
receiving a strobe signal which transitions whenever two consecutive bits in the data signal are the same;
generating a recovered clock signal from a combination of the data signal and the strobe signal;
sampling the data signal at a first sampling stage in dependence on the recovered clock signal, by supplying the data signal to a plurality of sampling circuits and obtaining consecutive samples of the data signal using alternating ones of the plurality of sampling circuits; and
sampling the data from the first sampling stage at a second sampling stage in dependence on a local system clock signal, wherein the second sampling stage includes a pair of sampling paths for each of the plurality of sampling circuits of the first sampling stage.

18. The method of claim 17, comprising sampling the received data signal at the first sampling stage on both a rising and a falling edge of the recovered clock signal.

19. The method of claim 17, wherein the generating of the recovered clock signal comprises taking the XOR of the data signal and the strobe signal.

20. The method of claim 17, wherein said plurality of sampling circuits is at least three sampling circuits.

21. The method of claim 17, wherein said plurality of sampling circuits is an odd number of sampling circuits.

22. The method of claim 17, wherein the sampling at the first sampling stage comprises sampling said consecutive samples of the data signal using said alternating ones of the plurality of sampling circuits in a round robin manner.

23. The method of claim 17, comprising sampling the received strobe signal at the first sampling stage in dependence on the recovered clock signal, and obtaining consecutive samples of the received strobe signal using said alternating ones of the plurality of sampling circuits.

24. The method of claim 17, comprising generating a generated strobe signal from the data samples sampled at the first sampling stage.

25. The method of claim 24, wherein the generating of the generated strobe signal comprises using a data/strobe encoders in each of said sampling circuits to generate the generated strobe signal for the respective data samples obtained by that sampling circuit.

26. The method of claim 23, comprising generating a valid signal at the second sampling stage in dependence on said sampled data and said sampled or generated strobe signal to indicate when the data output by the second sampling stage is valid.

27. The method of claim 17, wherein the receiving of the data and strobe signals comprises receiving the data and strobe signals according to a serial protocol.

28. The method of claim 27, wherein the receiving of the data and strobe signals comprises receiving the data and strobe signals according to an MIPI HIS standard.

29. The method of claim 27, wherein the receiving of the data and strobe signals comprises receiving the data and strobe signals according to one of standards IEEE 1394 and IEEE 1355.

30. The method of claim 17, comprising converting another serial protocol to said received data and strobe signals.

31. The method of claim 30, wherein said other protocol is SPI (Serial Peripheral Interface) protocol.

32. The method of claim 17, wherein the receiving of said data and strobe signals comprises receiving the data and strobe signals over a wired connection with a transmitter.

33. A system comprising a transmitter, a receiver, and a wired connection therebetween for transmitting a data signal and a strobe signal from the transmitter to the receiver, the strobe signal transitioning whenever two consecutive data bits in the data signal are the same, and the receiver comprising:
combining means for generating a recovered clock signal from a combination of the data signal and the strobe signal;
a first sampling stage arranged to sample the data signal in dependence on the recovered clock signal, wherein the first sampling stage comprises a plurality of sampling circuits each arranged to receive the data signal, the first sampling stage being arranged to obtain consecutive samples of the data signal using alternating ones of the plurality of sampling circuits; and
a second sampling stage arranged to sample the data from the first sampling stage in dependence on a local system clock signal, wherein the second sampling stage includes a pair of sampling paths for each of the plurality of sampling circuits of the first sampling stage.

\* \* \* \* \*